United States Patent [19]
Reininger et al.

[11] Patent Number: 5,539,892
[45] Date of Patent: Jul. 23, 1996

[54] ADDRESS TRANSLATION LOOKASIDE BUFFER REPLACEMENT APPARATUS AND METHOD WITH USER OVERRIDE

[75] Inventors: Russell Reininger; Jeff Slaton, both of Austin, Tex.

[73] Assignee: Motorola, Inc., Schaumburg, Ill.

[21] Appl. No.: 284,953

[22] Filed: Aug. 2, 1994

[51] Int. Cl.$^6$ ................................................. G06F 12/12
[52] U.S. Cl. ........................... 395/417; 395/486; 395/460
[58] Field of Search .................................... 395/425, 460, 395/486, 417; 364/200

[56] References Cited

U.S. PATENT DOCUMENTS 4,631,660  12/1986  Woffinden et al. ...................... 395/403
5,276,848  1/1994  Gallagher et al. ....................... 395/448

Primary Examiner—Jack A. Lane
Assistant Examiner—Kevin Verbrugge
Attorney, Agent, or Firm—Lee E. Chastain

[57] ABSTRACT

A data processor (10) has a translation lookaside buffer, a "TLB," (56) for translating internal effective addresses into external real addresses. A user programmable bit in a special purpose register (68) controls which TLB entry in a group of entries will be replaced after an unsuccessful translation. Normally, the data processor uses a hardware controlled algorithm to select an entry for replacement. However, the user can overwrite the value in the special purpose register to force a certain replacement scheme. The user can thereby protect certain important translation mappings or deterministically test the TLB after manufacture.

14 Claims, 4 Drawing Sheets

ADDRESS TRANSLATION LOOKASIDE BUFFER REPLACEMENT APPARATUS AND METHOD WITH USER OVERRIDE

FIELD OF THE INVENTION

The present invention generally relates to digital computing systems, and more specifically to a data processor with address translation capabilities.

BACKGROUND OF THE INVENTION

Modern data processors incorporate features related to a performance strategy known as address translation. Data processors that incorporate address translation schemes manipulate one set of addresses internally and another set externally for each location in memory space. Addresses manipulated internal to the data processor are often referred to as "effective" or "virtual" addresses. Addresses manipulated external to the data processor are often referred to as "real" or "physical" addresses.

Data processors that incorporate address translation schemes have several advantages relative to data processors without address translating abilities. First, address translation schemes permit a data processor to access "virtual memory" beyond its real addressing boundaries. Typically, virtual memory is memory "space" on a hard disk drive. Second, address translation schemes allow multiple application programs to simultaneously reside in a data processing system's memory without the danger of one application corrupting the data of another application. Third, address translation schemes permit multiple applications to access common data in memory even though each application will generate a different virtual address for the common data.

Data processors maintain tables that contain mappings to translate effective addresses to real addresses whenever the data processor accesses an external device. These tables may be located in main memory, in specialized internal memory arrays within the data processor or in both. Oftentimes, a data processor will maintain a subset of all possible address translation mappings in a high-speed internal cache, "a translation lookaside buffer or TLB." These data processors maintain all possible address translation mappings externally, in main memory. The data processor accesses the slow main memory tables for a translation mapping when the TLB is not able to translate a particular effective address. The data processor then stores the translation mapping in the TLB for future reuse. As a consequence, the data processor must have some strategy for selecting a less useful translation mapping, discarding it, and storing the new translation mapping in the same location once the TLB is fully populated. However, any fixed replacement algorithm is a compromise between all possible operating scenarios.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
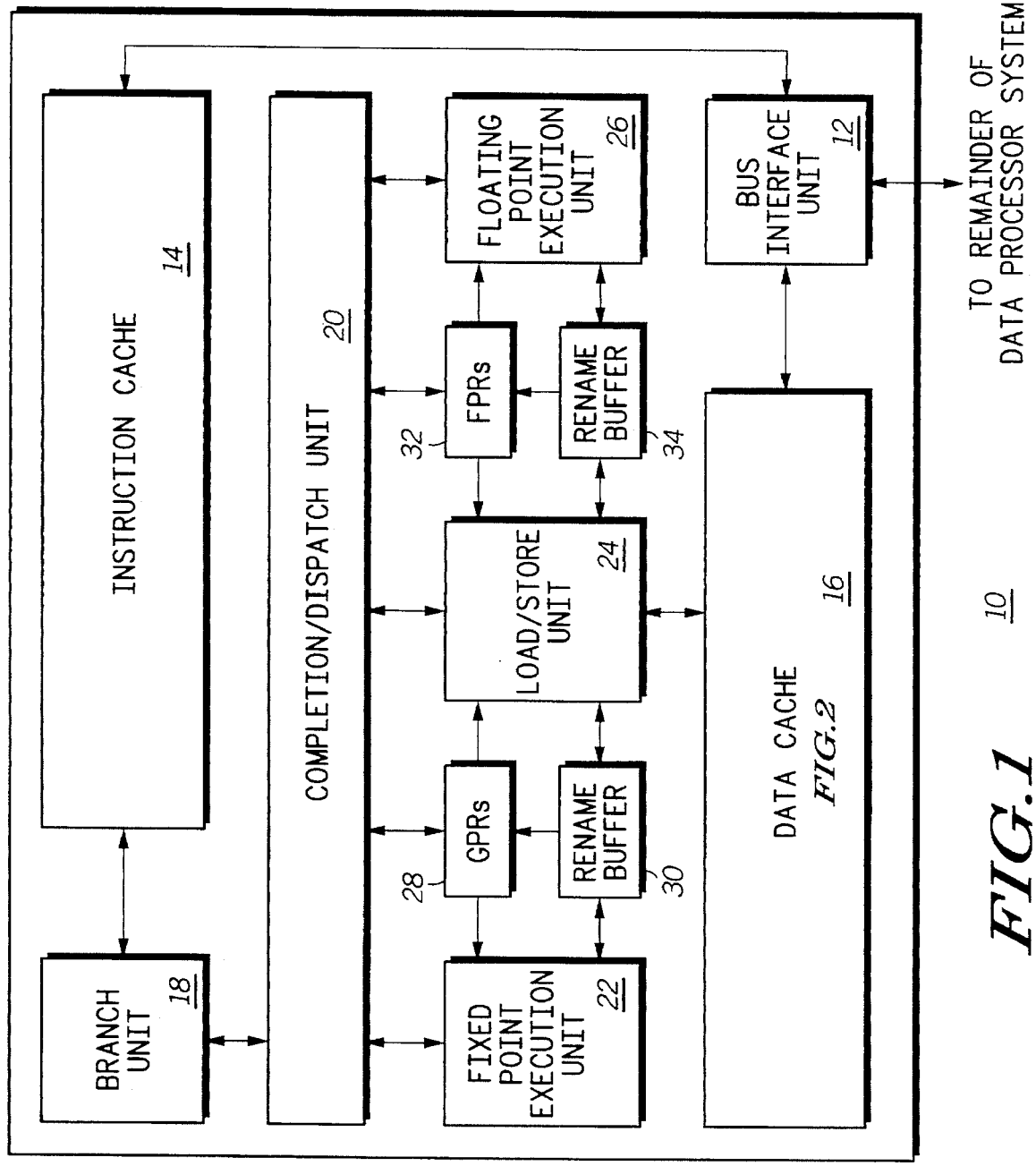
FIG. 1 depicts a block diagram of a data processor constructed in accordance with the present invention.

FIG. 1 depicts a block diagram of a data processor 10 constructed in accordance with the present invention. Data processor 10 is a data processor that improves its performance by incorporating an address translation scheme. In particular, data processor 10 includes a translation lookaside buffer or "TLB" in which it stores thirty-two sets of two mappings each for sixty-four recently used address translation mappings. Each of the sixty-four entries contains a tag field and a translation mapping. Each particular set is selected by a subset of the internal or "effective" address manipulated by data processor 10. The contents of the two associated tag fields are then compared to a second subset of the effective address to determine if a successful translation occurred. If one tag field matches the second subset, then a successful translation occurred. In this case, data processor 10 translates the effective address using the translation mapping associated with the matching tag field. If neither tag field matches the second subset, then no successful translation occurred. In this case, data processor 10 searches a table maintained in external memory (not shown). Ordinarily, data processor 10 replaces the least recently used one of a set with the new translation mapping. However, the designated entry may be changed by the operating system if desired. Therefore, the data processor may be advantageously operated to avoid overwriting certain translation mappings. Also, the TLB may be deterministically tested after manufacture.

Continuing with FIG. 1, a bus interface unit (hereafter BIU) 12 controls the flow of data between data processor 10 and the remainder of a data processing system (not depicted). As known in the art, such a data processing systems contains memory, input/output devices, and the like. BIU 12 is connected to an instruction cache 14 and to a data cache 16. Data cache 16 is more fully described below in connection with FIG. 2. Instruction cache 14 supplies an instruction stream to a branch unit 18 and to a completion/dispatch unit 20. Completion/dispatch unit 20 forwards individual instructions to an appropriate execution unit. Data processor 10 has a fixed point execution unit 22, a load/store execution unit 24, and a floating point execution unit 26. Fixed point execution unit 22 and load/store execution unit 24 read and write their results to a general purpose architectural register file 28, (labeled GPRs and hereafter GPR file) and to a first rename buffer 30. Floating point execution unit 26 and load/store execution unit 24 read and write their results to a floating point architectural register file 32, (labeled FPRs and hereafter FPR file) and to a second rename buffer 34.

The operation of data processor 10 without the disclosed power saving features is known in the art. In general, branch unit 18 and completion/dispatch unit 20 determine what sequence of programmed instructions is appropriate given the contents of certain data registers and the program steps themselves. Completion/dispatch unit 20 issues the individual instructions to the various execution units 22, 24 and 26. Each of the execution units performs one or more instructions of a particular class of instructions. The particular class of instructions of each execution unit is indicated by the name of the execution unit. For instance, floating point execution unit 26 executes floating point arithmetic instructions.

Fixed point execution unit 22 returns the results of its operations to designated entries in first rename buffer 30. First rename buffer 30 periodically updates an entry of GPR file 28 with an entry from first rename buffer 30 when all instructions preceding the instruction that generated the result have updated their GPR file entries. Completion/dispatch unit 20 coordinates this updating. Both first rename buffer 30 and GPR file 28 can supply operands to fixed point execution unit 22. Conversely, floating point execution unit 26 returns the results of its operations to designated entries in second rename buffer 34. Second rename buffer 34 periodically updates an entry of FPR file 32 with an entry in second rename buffer 34 when all instructions preceding the instruction that generated the result have updated their FPR file entries. Completion/dispatch unit 20 also coordinates this updating. Both second rename buffer 34 and FPR file 32 supply operands to floating point execution unit 26.

Load/store unit 24 reads data stored in GPR file 28, first rename buffer 30, FPR file 32 or second rename buffer 34 and writes the selected data to data cache 16. This data may also be written to an external memory system (not depicted) depending upon operating characteristics of data processor 10 not relevant to the disclosed invention. Conversely, load/store unit 24 reads data stored in data cache 16 and writes the read data to GPR file 28, first rename buffer 30, FPR file 32 or second rename buffer 34.

Figure 2:
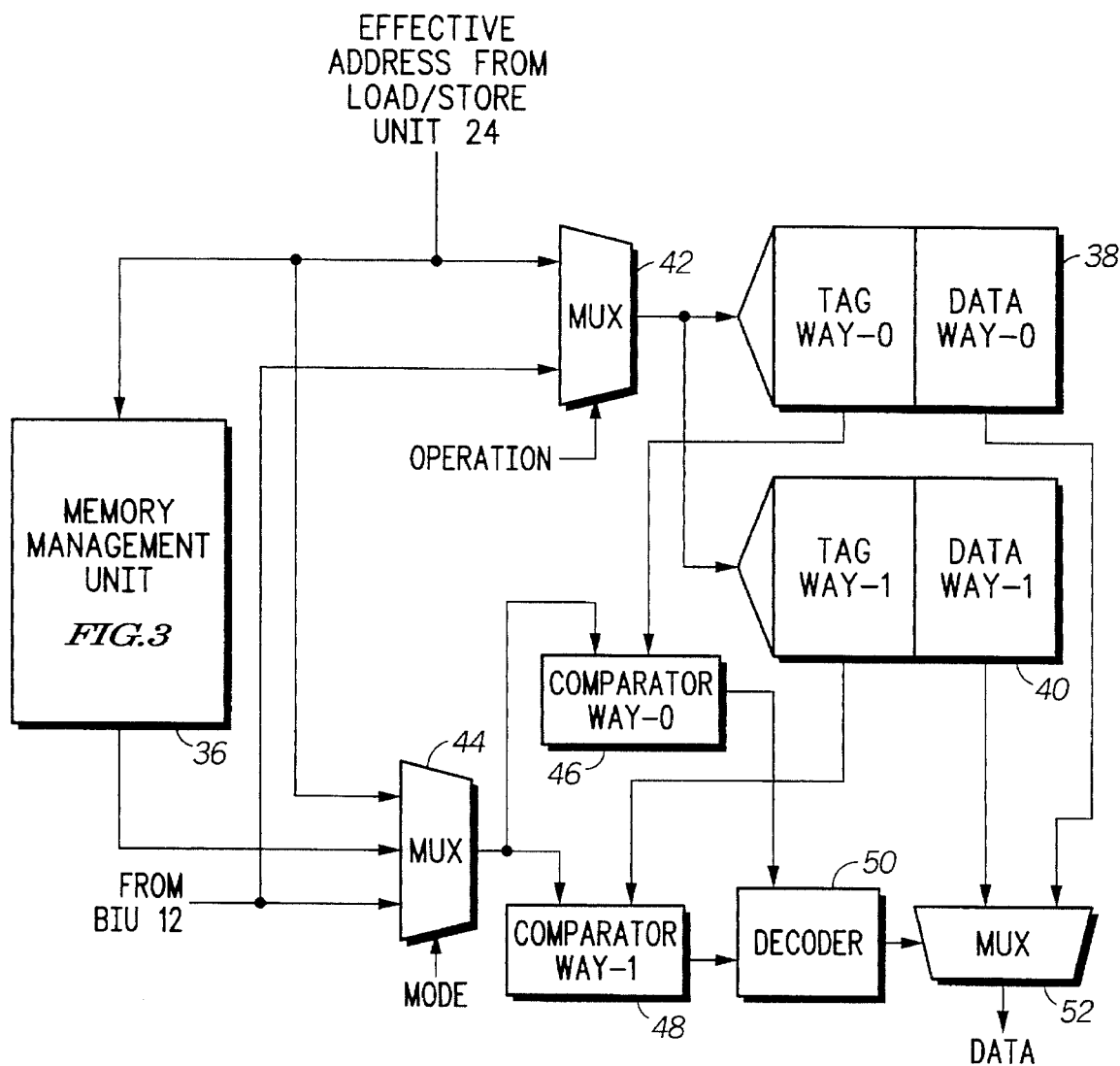
FIG. 2 depicts a block diagram of the data cache depicted in FIG. 1.

FIG. 2 depicts a block diagram of data cache 16 depicted in FIG. 1. Data cache 16 and instruction cache 14 are substantially similar. Therefore, the following discussion will focus on data cache 16, noting the differences from instruction cache 14 where appropriate. Data cache 16 has a memory management unit (hereafter "MMU") 36 that receives the most significant bits of an effective address from load/store unit 24. The received effective address identifies data that load/store unit 24 wants to either store to main memory or load from main memory. MMU 36 contains one or more tables that translate the received effective address into a physical address when combined with the least significant bits of the effective address. In the depicted embodiment, data within data cache 16 and instruction cache 14 is indexed according to the least significant bits of the physical address of the data. However, other portions of data processor 10 index data according to the effective address. MMU 36 is described below in connection with FIGS. 3 through 5.

Data cache 16 has a first cache block 38 and a second cache block 40. First cache block 38 and second cache block 40 form a two-way set-associative cache. Each cache block stores a plurality of pairs of data and associated tags. One pair of data and tag are each indexed from first cache block 38 and from second cache block 40 for each address output by a first multiplexer 42.

A first multiplexer 42 receives a subset of the effective address from load/store unit 24 described above and a subset of a physical address from BIU 12. The physical address supplied by BIU 12 identifies data which another device intends to read, write or otherwise manipulate: a "snooped" address. A control signal OPERATION selects which address first multiplexer 42 outputs. Circuitry (not shown) generates the control signal OPERATION responsive to whether data processor 10 is performing a load/store operation or is snooping some other device's data operation.

A second multiplexer 44 selects one of three addresses: the two addresses described above in connection with first multiplexer 42 and the real page number (RPN) from MMU 36. A control signal MODE selects which address second multiplexer 44 outputs. Circuitry (not shown) generates the control signal MODE responsive to whether data processor 10 is performing a load/store operation or is snooping some other device's data operation. This circuitry also permits the effective address from load/store unit 24 to bypass MMU 36 responsive to a bit within a user programmable register.

A first comparator 46 compares a tag output from first cache block 38 and a subset of the physical address output by second multiplexer 44. A particular address output by first multiplexer 42 indexes the tag and a data block. First comparator 46 asserts a first hit signal if its two inputs are logically equivalent. A second comparator 48 compares a tag output from second cache block 40 and a subset of the physical address output by second multiplexer 44. Second comparator 48 asserts a second hit signal if its two inputs are logically equivalent. A 2-to-1 decoder 50 receives the hit signals generated by first comparator 46 and second comparator 48. Decoder 50 generates a single select signal coupled to a third multiplexer 52. Third multiplexer 52 receives a first data block output by first cache block 38 and a second data block output by second cache block 40. The first and second data blocks are indexed by the same particular address output by first multiplexer 42.

The operation of data cache 16 without the disclosed invention is known in the art. In general, load/store unit 24 reads data from (a "load" instruction) or writes data to (a "store" instruction) data cache 16 responsive to programmed instructions.

In the case of a load instruction, MMU 36 translates the effective address generated by load/store unit 24 into a physical address and compares the two corresponding tags to the translated address. One or none of the two tags may match the translated address depending on the prior history of data processor 10. If one of the tags does match, then the desired data is already in one of the cache blocks. In this case, the data block corresponding to the matching tag is output as DATA to load/store unit 24. If neither tag matches the translated address, then the data is not present in data cache 16. In this case, decoder 50 generates a signal(s) (not shown) that causes BIU 12 to request the data indexed by the translated address from main memory (not shown).

In the case of a store instruction, MMU 36 translates the effective address generated by load/store unit 24 into a physical address. If the particular unit of data is cacheable, then data cache 16 stores the data and the subset of the physical address into an entry of one of the two cache blocks. Data cache 16 will use a subset of the effective address to index into one of the two cache blocks. A later time, data cache 16 will copy back its previously stored data to the common memory system to ensure data coherency. If the particular unit of data is non-cacheable, then data cache 16 will store the data directly to the common memory system.

Figure 3:
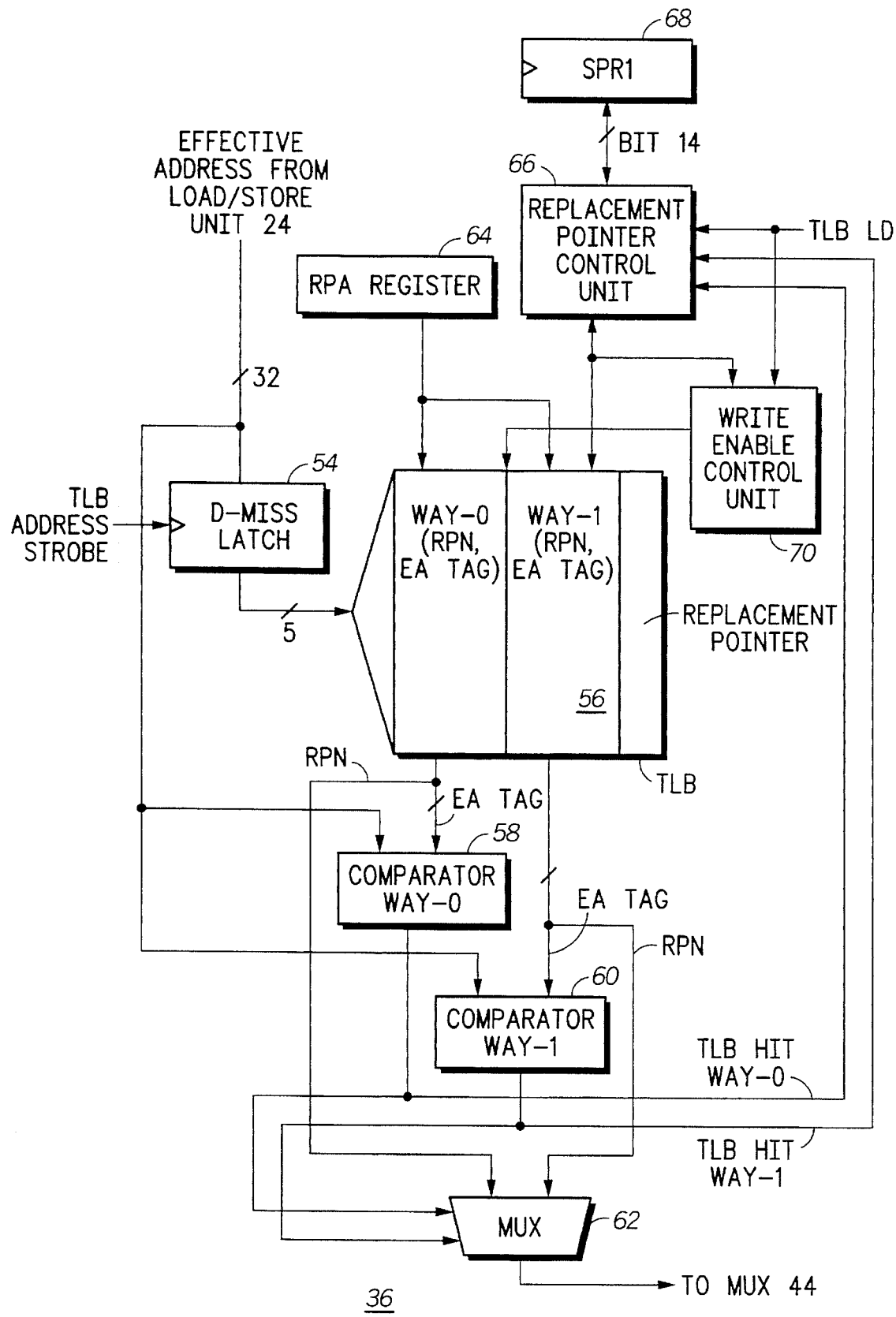
FIG. 3 depicts a block diagram of the memory management unit depicted in FIG. 2.

FIG. 3 depicts a block diagram of the MMU 36 depicted in FIG. 2. A D-miss latch 54 receives the effective address to be translated by MMU 36. A control signal TLB ADDRESS STROBE causes D-miss latch 54 to sample and hold the incoming effective address. Load/store unit 24 asserts the control signal TLB ADDRESS STROBE whenever it presents a new effective address to MMU 36 for translation. A subset of the contents of D-miss latch 54 (five bits) are used to select one set of thirty-two sets in a translation lookaside buffer ("TLB") 56. In the depicted embodiment, TLB 56 is a two-way set associative cache. In an N-way set associative cache, each data field may be stored in any one of N different entries, a "set," where N is an integer. Each one of the thirty-two sets contains two entries or "ways" and a replacement pointer suggesting one of the two entries to replace when performing a TLB load instruction. Each entry contains an effective address-real page number ("RPN") pair.

A comparator 58 receives the input effective address and compares it to the RPN stored in way-0 of a particular set selected by the effective address. Comparator 58 asserts a control signal TLB HIT WAY-0 if its two inputs are logically equivalent. A comparator 60 also receives the input effective address and compares it to the RPN stored in way-1 of the particular set. Comparator 60 asserts a control signal TLB HIT WAY-1 if its two inputs are logically equivalent. A 2:1 multiplexer ("MUX") 56 receives the real page numbers output by the two ways. The control signals TLB HIT WAY-0 and TLB HIT WAY-1 select the input of multiplexer 56 generating the hit signal.

The output of a real page address ("RPA") register 64 is connected to the RPN field bits lines of way-0 and way-1 in TLB 56. A replacement pointer control unit 66 reads and writes bit 14 of a special purpose register ("SPR1") and the replacement pointer of a set selected by a write enable control unit 70. Replacement pointer control unit 66 also receives the control signals TLB HIT WAY-0 and TLB HIT WAY-1 and the control signal TLB LD. Completion/dispatch unit 24 asserts the control signal TLB LD when it executes a TLB load instruction. Write enable control unit 70 also receives the control signal TLB LD.

The operation of MMU 36 is described below in connection with FIGS. 4 and 5.

Figure 4:
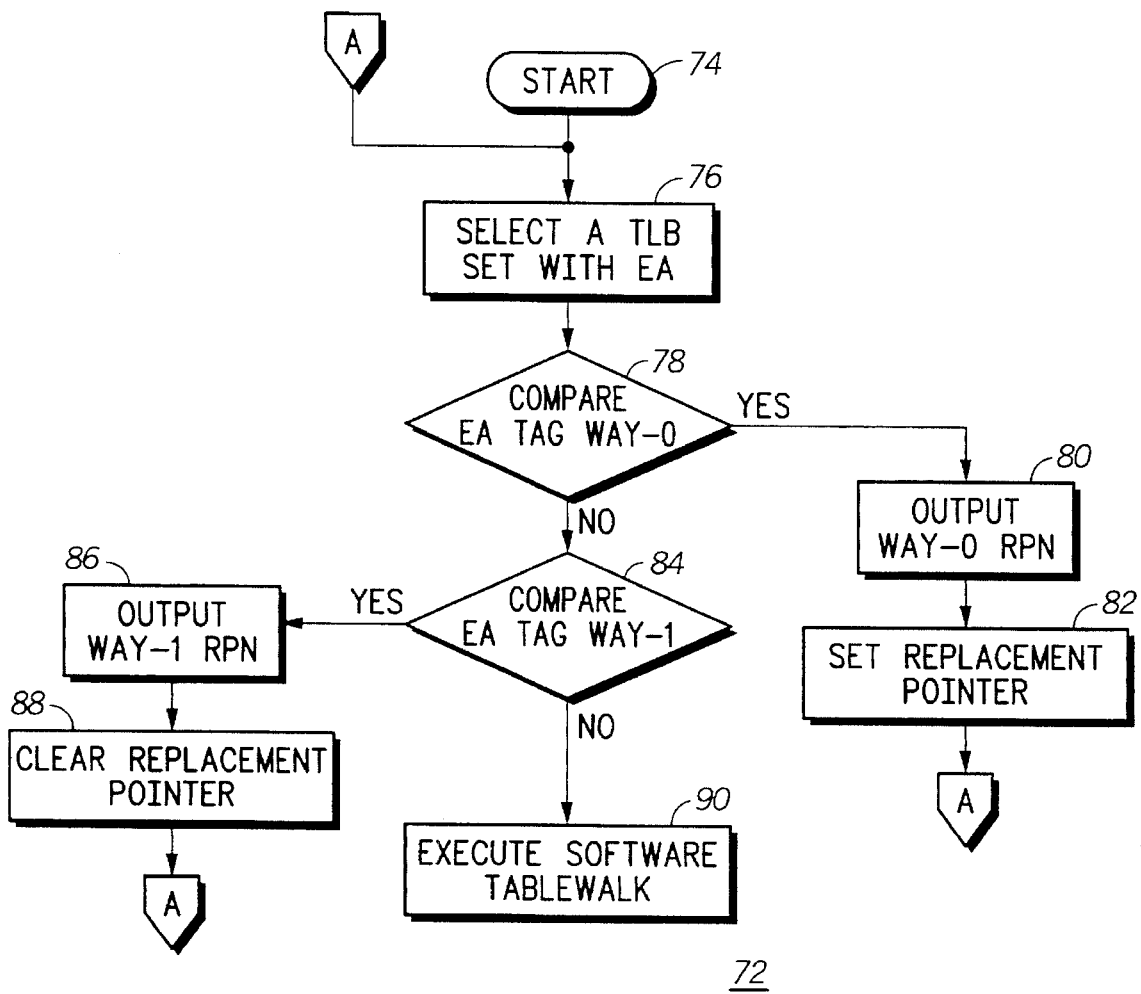
FIG. 4 depicts a flow diagram of an address translation access operation.

FIG. 4 depicts a flow diagram 72 of an address translation access operation. Flow diagram 72 begins at a step 74 each time load store unit 24 presents an effective address to MMU 36 for translation into a real address. Five bits of the presented address are used to select a set of TLB 56, a step 76. Comparator 58 compares the remaining bits of the presented effective address to the effective address tag stored in way-0 of the selected set, a step 78. If the two fields are logically equivalent, a "TLB hit", then multiplexer 62 outputs the RPN stored in way-0 to multiplexer 44 (depicted in FIG. 2), a step 80. Replacement pointer control unit 66 also sets the pointer of the selected set indicating that it should replace the RPN stored in way-1, when necessary, a step 82. If the two fields were not logically equivalent in step 78, then comparator 60 compares the same bits of the presented effective address to the effective address tag stored in way-1, a step 84. If the two fields are logically equivalent in step 84, a "TLB hit", then multiplexer 62 outputs RPN way-1 to multiplexer 56, a step 86. Replacement pointer control unit 66 also clears the pointer of the selected set indicating that it should replace the RPN stored in way-0, when necessary, a step 88. In general, an N-way set associative TLB will have N compare steps. Also, if N is great than two, the complexity of the replacement pointer may increase to reflect the $2^N$ different possible replacement orders.

If the two fields were not logically equivalent in steps 78 or 84, a "TLB miss," then data processor 10 takes an exception and accesses translation tables in memory, "a software tablewalk," a step 90. It should be understood that MMU 36 performs steps 78 and 84 in parallel to decrease cycle time. Also, the depicted embodiment employs a "least recently read" algorithm to select one way for replacement. In particular, once a way is read during a translation, it is considered the most recently read way of the two ways in a particular set. The other way is therefore marked for replacement at the next TLB miss. Other algorithms may be substituted in place of the described method and still practice the disclosed invention.

It should be understood that certain address translation schemes require two sequential accesses to two different translation mappings stored in two separate caches. Typically, the two accesses output two partial mappings that are concatenated to form a final output mapping. The disclosed invention may be incorporated into either or both caches if either or both of the caches incorporates a replacement algorithm.

Figure 5:
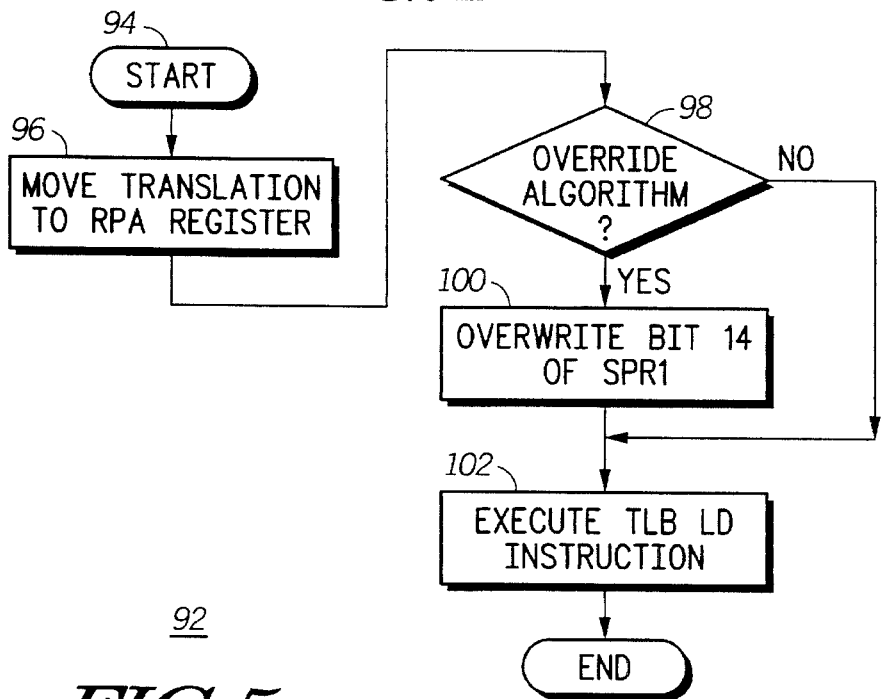
FIG. 5 depicts a flow diagram of an address translation load operation.

FIG. 5 depicts a flow diagram 92 of a TLB load operation. Flow diagram 92 begins at a step 94 each time data processor 10 performs a software tablewalk. Replacement pointer control unit 66 writes the suggested replacement way to bit 14 of SPR1 68 when it determines that a TLB miss occurred. Data processor 10 then accesses a table in memory (not shown) to retrieve a new address mapping. Once retrieved, data processor writes the translation mapping and the associated effective address to RPA register 64, a step 96.

At this point, data processor 10 can override the suggested replacement way, a step 98. If the programmer desires to replace a particular way within TLB 56, then he can program a series of instructions to write a particular value to bit 14 of SPR1, a step 100. For instance, data processor 10 could logically OR the contents of SPR1 with 0002 0000 (hex) to force a replacement of way-1. Conversely, data processor 10 could logically AND the contents of SPR1 with FFFD FFFF (hex) to force a replacement of way-0. Data processor 10 then executes a TLB load instruction, a step 102. A TLB load instruction causes write control unit 70 to select one way of the set originally indexed by the effective address (still latched in D-miss latch 54). The bit cells of the selected way are coupled to the RPA register 64. The new RPN and associated effective address are thereby written into the selected way. If the programmer does not desire to replace a particular way within TLB 56, then flow diagram 92 branches from step 98 directly to step 102.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 10. It is to be understood therefore, that the invention encompasses all such modifications that do not depart from the spirit and scope of the invention as defined in the appended claims.

What is claimed is:

1. A data processor with an address translation buffer comprising:

an execution unit generating an address;

an address translation buffer coupled to the execution unit, the address translation buffer comprising a plurality of entries, each one of the plurality of entries comprising:

a set of N translation mapping fields, where N is an integer, a differing one of the set of N translation mapping fields storing a differing one of a set of N translation mappings and a corresponding one of a set of N tags, the set of N translation mapping fields indexed by a first subset of the address, the set of N translation mapping fields operable to output a selected one of the set of N translation mapping fields if a second subset of the address is logically equivalent to the corresponding one of the set of N tags;

a replacement pointer field storing a pointer, the pointer indicating one of the set of N translation mapping fields to receive a new translation mapping; and a replacement pointer control unit coupled to the address translation buffer, the replacement pointer control unit operable to overwrite a first value to the replacement pointer field responsive to a first state of a user-accessible control register during normal replacement operation of the address translation buffer, the replacement pointer field operable to overwrite a second value to the replacement pointer field responsive to a second state of the user-accessible control register.

2. The data processor of claim 1 wherein the replacement pointer control unit writes the replacement pointer to the user-accessible control register if the address translation buffer is not able to translate the address.

3. The data processor of claim 2 wherein the replacement control unit updates the replacement pointer according to a least recently read algorithm.

4. The data processor of claim 3 wherein N is greater than one.

5. The data processor of claim 3 wherein N equals two.

6. A method of operating a data processor comprising the steps of:

generating, by an execution unit in a data processor, a first selected address for translation;

searching a translation buffer in the data processor to determine whether a translation entry for the first selected address is resident in the translation buffer;

providing a first control signal indicating whether the translation entry for the first selected address is resident in the translation buffer;

storing a replacement identifier in a control register, if the first control signal indicates that the translation entry for the first selected address is not resident in the translation buffer, the replacement identifier signifying a first translation entry for replacement by a new translation entry; and modifying the replacement identifier in the control register to indicate a second translation entry for replacement with the new translation entry, the step of modifying under user control during normal replacement operation of the translation buffer.

7. The method of claim 6 wherein the step of modifying the replacement identifier comprises the step of writing, under software control, a new value into the control register, the new value signifying a new replacement identifier of the second translation entry.

8. The method of claim 7 further comprising the step of loading the new translation entry into the translation buffer at an entry location specified by the replacement identifier stored in the control register.

9. The method of claim 7 further comprising the step of loading the new translation entry into the translation buffer at a location specified by the replacement identifier stored in the control register and a subset of the first selected address.

10. The method of claim 6 further comprising the step of loading the new translation entry into the translation buffer at an entry location specified by the replacement identifier stored in the control register.

11. The method of claim 6 further comprising the step of loading the new translation entry into the translation buffer at a location specified by the replacement identifier stored in the control register and a subset of the first selected address.

12. A method of operating a data processor comprising the steps of:

searching a translation buffer to determine whether a translation entry for a first selected address is resident in the translation buffer;

generating a first control signal indicating whether the translation entry for the first selected address is resident in the translation buffer;

generating a replacement identifier indicating a first entry for replacement with a new translation if the first control signal indicates that the translation entry for the first selected address is resident in the translation buffer;

storing the replacement identifier in the translation buffer if the first control signal indicates that the translation entry for the first selected address is resident in the translation buffer;

storing the replacement identifier in a control register if the first control signal indicates that the translation entry for the first selected address is not resident in the translation buffer; and modifying the replacement identifier in the control register to indicate a second entry for replacement with the new translation, the step of modifying under user control during normal replacement operation of the translation buffer.

13. The method of claim 12 further comprising the step of loading the new translation into the translation buffer at an entry location specified by the replacement identifier stored in the control register.

14. The method of claim 12 further comprising the step of loading the new translation into the translation buffer at a location specified by the replacement identifier stored in the control register and a subset of the first selected address.

* * * * *